United States Patent [19]

French

[11] 3,837,233
[45] Sept. 24, 1974

[54] CONTINUOUSLY VARIABLE FRICTION DRIVE HAVING INTERMEDIATE MEMBER ENGAGED ON BOTH SIDES FOR INCREASED TORQUE TRANSMISSION

[76] Inventor: Michael Joseph French, 4 Haverbreaks Pl., Lancaster, England

[22] Filed: July 17, 1973

[21] Appl. No.: 379,984

[30] Foreign Application Priority Data

July 20, 1973  Great Britain.................... 34004/73

[52] U.S. Cl. ................................................ 74/200
[51] Int. Cl. .......................................... F16h 15/26
[58] Field of Search ...................................... 74/200

[56] References Cited
UNITED STATES PATENTS

| | | | |
|---|---|---|---|
| 2,660,073 | 11/1953 | Patin.................................. | 74/200 |
| 2,850,911 | 8/1958 | Kraus................................. | 74/200 |

*Primary Examiner*—Samuel Scott
*Assistant Examiner*—Allan Russell Burke
*Attorney, Agent, or Firm*—Owen, Wickersham & Erickson

[57] ABSTRACT

The invention provides a continuously variable friction drive comprising first and second members rotatable about a first axis and having convex and concave driving surfaces respectively, a third member rotatable about a second axis intersecting the first axis and having concave and convex driving surfaces arranged respectively to engage the convex and concave driving surfaces on the first and second members respectively, a pivotal mounting for the third member arranged so that the third member may pivot about a third axis, clamping means for causing relative movement between the first and second members thus to force parts of the driving surfaces on the first and second members into close proximity with adjacent parts of the driving surfaces on the third member, said parts providing drive areas through which drive takes place between the first and second members on the one hand and the third member on the other hand and actuating means for pivoting the third member about the third axis thus to vary the distances of said drive areas from at least one of the first and second axes thus to vary the ratio of the drive, the drive areas being substantially symmetrically disposed about a line passing through the intersection of said first and second axes.

11 Claims, 4 Drawing Figures

PATENTED SEP 24 1974 3,837,233

CONTINUOUSLY VARIABLE FRICTION DRIVE HAVING INTERMEDIATE MEMBER ENGAGED ON BOTH SIDES FOR INCREASED TORQUE TRANSMISSION

This invention relates to so called friction drives in which drive is transmitted from one member to another by the shearing forces in a film of lubricant between the members which are in very close proximity. Although the members are not in direct frictional engagement there is a drive area over which the members are in such close proximity that drive takes place between them due to the shearing forces of the film of lubricant in the area.

Various types of friction drive are already known, one such drive comprising opposed toroidal surfaces on driving and driven members respectively with rollers engaging the surfaces to transmit drive between the members and means to tilt the rollers to vary the effective radii of the drive areas of the rollers with the surfaces and thus the ratio of the drive. In this known type of drive the drive areas between the rollers and the toroidal surfaces are limited in size. Up to a limit governed by loss of efficiency, the larger the drive areas the greater is the power that can be transmitted by the drive. In turn, the size of the drive areas depends upon the relative radii of curvature of the surfaces in the drive area.

It is an object of the present invention to provide a friction drive in which the drive areas can be larger than in previously known drives whereby the power which can be transmitted by a given size of drive can be increased as compared with the power which can be transmitted by a drive of the known type.

According to the invention I provide a continuously variable friction drive comprising first and second members rotatable about a first axis and having convex and concave driving surfaces respectively, a third member rotatable about a second axis intersecting the first axis and having concave and convex driving surfaces arranged respectively to engage the convex and concave driving surfaces on the first and second members respectively, a pivotal mounting for the third member arranged so that the third member may pivot about a third axis, clamping means for causing relative movement between the first and second members thus to force parts of the driving surfaces on the first and second members into close proximity with adjacent parts of the driving surfaces on the third member, said parts providing drive areas through which drive takes place between the first and second members on the one hand and the third member on the other hand and actuating means for pivoting the third member about the third axis thus to vary the distances of said drive areas from at least one of the first and second axes thus to vary the ratio of the drive, the drive areas being substantially symmetrically disposed about a line passing through the intersection of said first and second axes.

The first, second and third members will be generally bowl shaped and by using members of this shape I have found that larger drive areas can be obtained than when using toroidal surfaces and rollers as in the known type of friction drive. This enables, for a given size of drive, a greater power to be transmitted. I have also found that there is comparatively large freedom in designing the drive, i.e., designing the driving surfaces. In a simple arrangement, three out of the four driving surfaces may be toroidal and defined by circular arcs.

Preferably the third axis will pass through the intersection of the first and second axes. Normally there will be two third members each pivotable about a third axis, the third members being pivotable in synchronism and each third member being rotatable about a second axis, both said second axes and said first axis intersecting.

In one arrangement the input and output to and from the drive will be via the first and second members on the one hand and via the third member on the other hand. In an alternative arrangement, there may be two sets of first and second members rotatable about a common first axis with two third members arranged as described above, each third member being engaged with the first and second members of each set. In this arrangement the input and output to and from the drive will be via the two sets of first and second members.

The clamping means are preferably hydraulic and can be provided by a cylinder formed in one of the first and second members and a piston formed in the other member, hydraulic fluid being supplied to the cylinder. Alternatively, the clamping means may be pneumatically operated or there may be ball or roller cam means. In a further arrangement a strong spring could act as the clamping means for causing the first and second members to move into very close proximity to the or each third member.

In one arrangement, the changes in the distances of the drive areas from the first and second axes which take place during pivoting of the or each third member are such that as the distances from the first axis decrease the distances from the second axis increase and vice versa. Alternatively, the distances from the second axis may remain constant and the distances from the first axis may vary. In this arrangement there is less ratio change for a given pivotal movement of the third members.

BRIEF DESCRIPTION OF THE DRAWINGS

Two embodiments will now be described in detail by way of example with reference to the accompanying drawings in which.

DESCRIPTION OF THE PREFERRED EMBODIMENTS

Figure 1:
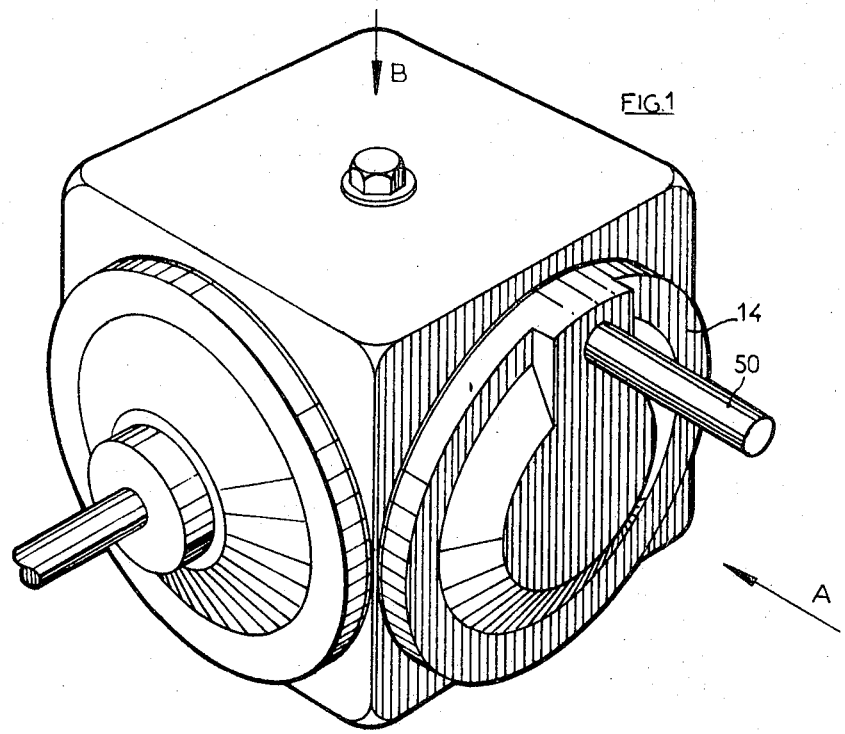
FIG. 1 is a perspective view of a continuously variable friction drive constituting a first embodiment of the invention.
Figure 2:
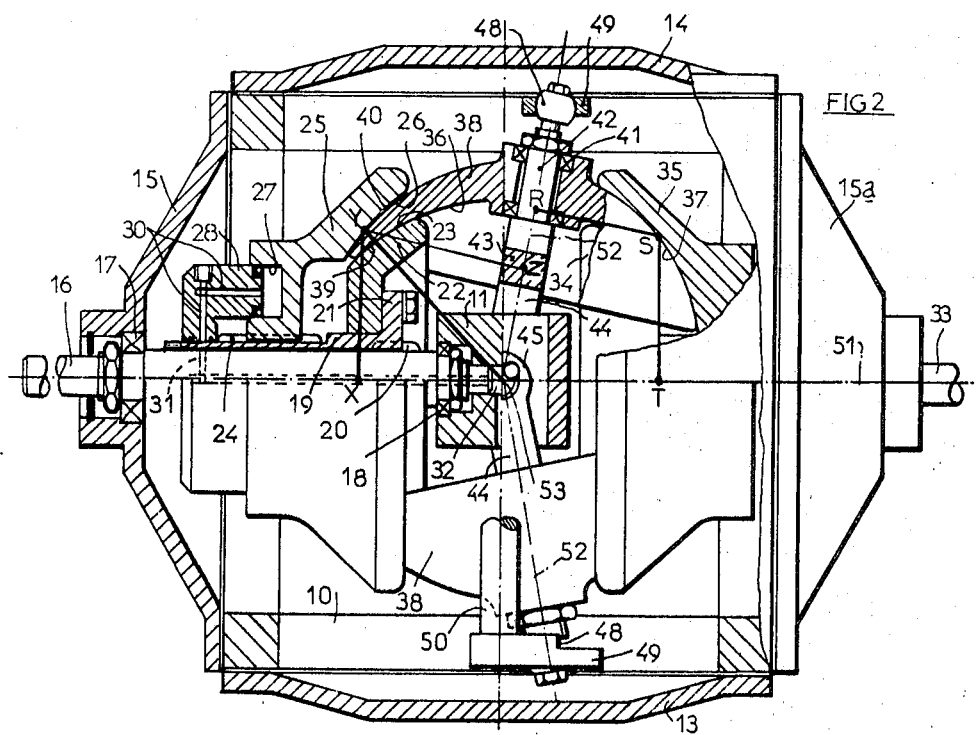
FIG. 2 is a part sectional view in the direction of the arrow B in FIG. 1.
Figure 3:
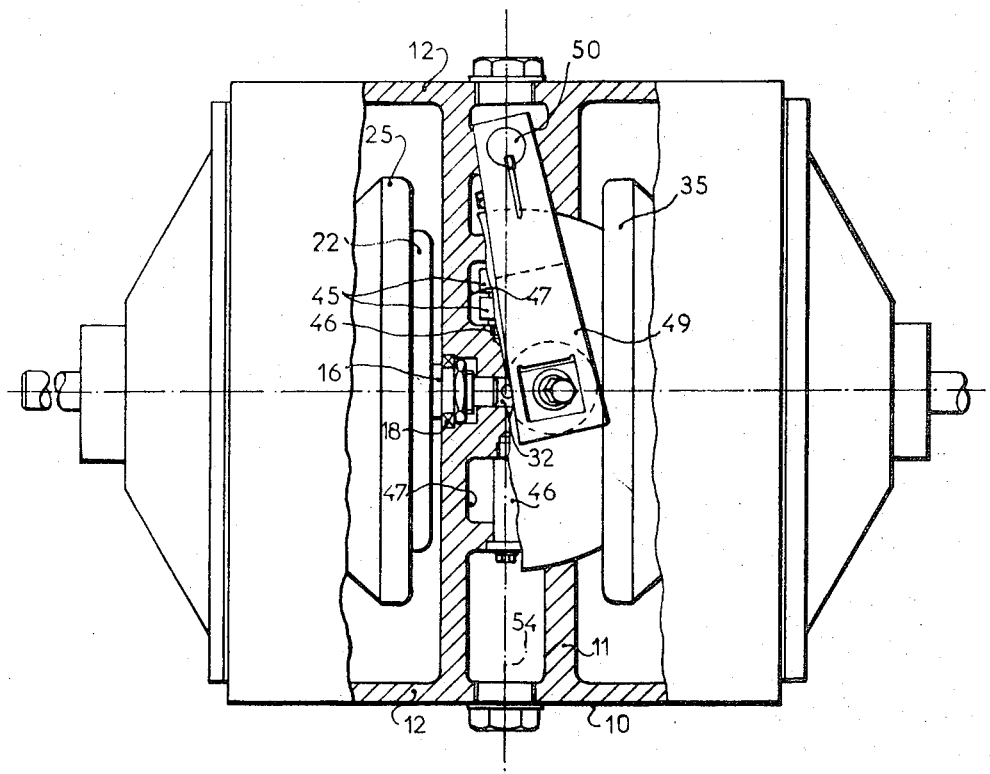
FIG. 3 is a part sectional view of the drive of FIG. 1 in the direction of the arrow A in FIG. 1.

Referring first to FIGS. 1 to 3, the drive comprises a casing formed from a casting indicated generally at 10 having a central web 11, the casting providing walls 12 of the casing and there being end plates such as 13, 14, 15 and 15a.

An input shaft 16 is supported in a bearing 17 in the end plate 15 and in further bearing 18 in the web 11. The input shaft carries a flanged sleeve 19 which is splined at 20 to the shaft. Secured to the flange 21 of the sleeve is a first member 22 which is generally of bowl shape and has a convex driving surface 23. The sleeve 19 is externally splined at 24 and mounted on these splines is a second member 25 which is also of bowl shape and has a concave driving surface 26. Formed in the member 25 is an annular cylinder 27 into which fits an annular piston 28 carrying ring seals 29. Hydraulic fluid may be introduced into the cylinder 27 through passages 30 in the piston 28 which communicate with passages 31 in the shaft 16. The passages 31 open into a bore 32 in the web 11 so that hydraulic fluid can be introduced into the cylinder 27 from the bore 32.

An output shaft is indicated at 33 and carries first and second members 34 and 35 respectively which are arranged on the shaft 33 in a manner similar to that in which the members 22 and 25 are arranged on the input shaft 16. The first member 34 has a convex driving surface 36 and the second member 35 has a concave driving surface 37.

The fluid pressure in the cylinder 27 may be the same as that in the similar cylinder in the member 35 or the pressures may be different to give sufficient drive without unnecessary losses. The pressures may be controlled according to the torque transmitted and the gear ratio in which the drive is operating.

Two third members indicated at 38 are arranged to engage the two sets of first and second members 22, 25 and 34, 35. The third members 38 are arranged in similar fashion and referring to the upper member 38 shown in FIG. 2 this is generally of bowl shape and has an internal concave driving surface 39 and an external convex driving surface 40. The member 38 is rotatable on bearings 41 for rotation about a pivot pin 42. The inner end of the pivot pin is connected to a fork 43 and the limbs 44 of the fork are provided with apertured bearings 45 at their free ends and these apertured bearings are engaged with pins 46 arranged in the web 11. The web is apertured at 47 to give clearance to the limbs 44 and as will be seen from FIG. 3 the bearings 45 of the fork supporting one third member 38 are arranged side by side with the bearings 45 supporting the other member 38.

At its outer end the pivot pin is provided with a collar 48 having an external spherical surface which is engaged by an internal spherical surface on a bar 49. The bar 49 is at its other end secured to an actuating rod 50 which extends from the drive as shown in FIG. 1 so that upon turning of the bar 50 the positions of the members 38 can be changed.

The first and second members 22 and 25 and 34 and 35 respectively are all coaxial and are rotatable about a first axis indicated by line 51. Each of the third members 38 is rotatable about a second axis each of which is indicated by the line 52. The axes 51 and 52 intersect at 53. The pivot pins 42 are rotatable about a third axis indicated by the line 54 in FIG. 3 and this axis also passes through the point of intersection 53 of the first and second axes. It is not necessary however that the third axis should intersect the first and second axes or that both the pivot pins should rotate about the same axis.

For example, the pivot pins 42 may each rotate about separate third axes which are disposed symmetrically relative to the first axis 51 and which are positioned centrally relative to the two sets of first and second members.

As will be appreciated from the above description if hydraulic fluid is introduced into the cylinder 27 the pairs of surfaces 23, 39 and 26, 40 will be brought into close proximity. As described above, there will be a thin film of lubricant between each pair of surfaces and drive areas will be established between the surfaces in close proximity so that rotation of the input shaft 16 and hence the members 22 and 25 will result in rotation of the members 38 about the axes 52. In a similar manner drive areas will be established between the pairs of surfaces 37, 40 and 36, 39 by pressurising the hydraulic cylinder in the member 35. Thus the rotation of the member 38 about axes 52 is transmitted to the member 34 and 35 and hence to the output shaft 33.

Considering the drive in the positions shown in FIG. 2 the gear ratio of the drive can be written as XY/YZ × RS/ST where XY and YZ are the perpendicular distances of the centre of the drive area between surfaces 26 and 40 from the axes 51 and 52 respectively and ST and RS are the corresponding perpendicular distances of the centre of the drive area between surfaces 37 and 40 from axes 51 and 52 respectively.

The gear ratio of the drive can therefore be varied by pivoting the pins 42 about the third axis 53 in order to vary the distances XY, YZ, RS and ST.

As will be described in more detail in relation to FIG. 4 it is preferred that the areas of contact move through a greater angle than the angle through which the members 38 are moved thus allowing for comparatively large changes of ratio with comparatively small movements of the members 38. Alternatively, the members 38 may be provided, adjacent their outer edges, with thickened portions or ribs which are always arranged to provide the driving surfaces on the members 38 and these surfaces thus remain in fixed relation to the axes 52 as the members 38 are rocked about the axis 53. In this arrangement the change in ratio is obtained solely by varying the distances of the contact areas from the axis 51.

A simplified theoretical treatment of the design criteria which must be met in order for the four driving surfaces 26, 40, 39 and 23 associated with the shaft 16 and pins 42 of FIG. 2 to operate correctly will now be given.

Considering these four surfaces and assuming that the drive areas between these surfaces are small enough to be treated as points, satisfactory operation of the drive requires that these points lie on or closely adjacent to a straight line (e.g. YO) passing through the point of intersection of the axes 51 and 52.

If the shapes of one pair of mating surfaces (e.g. 26 and 40) are assigned arbitrarily, subject to the requirement that the surfaces provide the required theoretical point drive area condition specified above throughout the entire rotational range of pins 42, then the position of the drive area for any given position of the pins 42 can be expressed mathematically as a function of the angle between the pins 42 and the shaft 16.

If now the shape of another surface (e.g. 39) is assigned, assuming that the drive area of this surface lies on the line YO in FIG. 2, the position of the drive area can again be expressed mathematically as a function of the angle between the pins 42 and the shaft 16. Having derived this mathematical expression which gives the position of the drive area on surface 39 the shape of the fourth surface 23 which will co-operate in the desired manner with the surface 39 can then be determined by plotting the required positions of the drive area from the mathematical expression representing the position of the drive area at the surface 39 for various values of the angle between the pins 42 and shaft 16.

If surfaces 26, 40 and 39 are assigned toroidal shapes defined by circular arcs, for ease of production, it will be found that the fourth surface 23 will of necessity be defined by a non-circular arc.

The process described above for obtaining the shape of the four surfaces 26, 40, 39 and 23 can be repeated for a drive with any number of mating pairs of surfaces, the general plan being to assign the shape of one pair and one surface of each remaining pair and to determine the shape of the other surface of each remaining pair in the manner described above in connection with the surface 23.

It should also be mentioned that the desired drive area condition can only be maintained if some of the members are free to move axially. For example, considering the drive shown in FIG. 2 rotation of the upper pin 42 in an anti-clockwise sense about axis 53 will necessitate members 22 and 25 moving apart and members 33 and 35 moving closer together. This can be achieved by arranging one of each pair of members to move axially relative to the other member of each pair and by arranging each pair of members to be axially slidable as a unit on the associated shaft 16 or 33.

Figure 4:
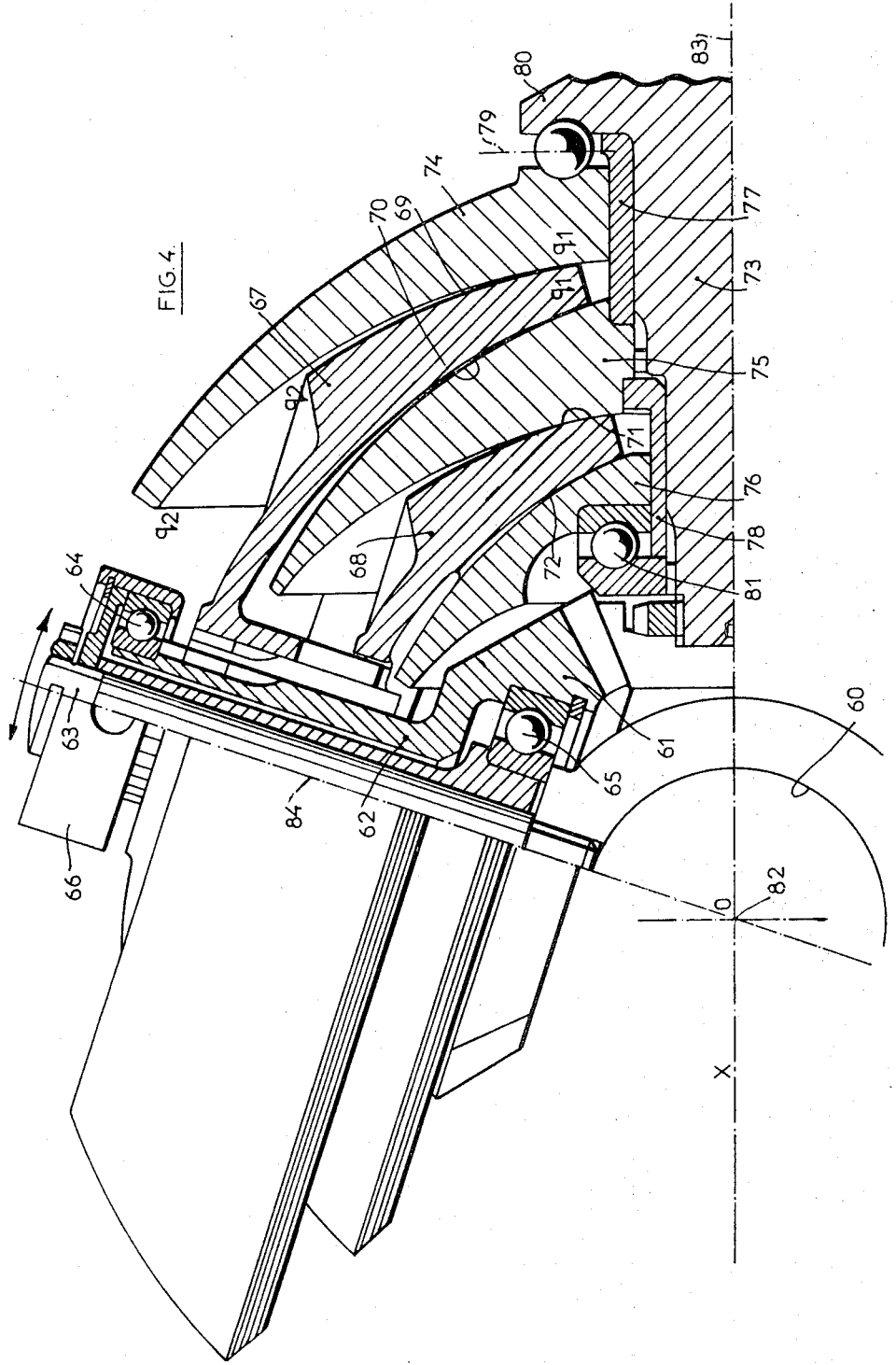
FIG. 4 is a part section through a continuously variable friction drive constituting a second embodiment of the invention.

Referring now to FIG. 4, this shows a half section through a second embodiment of the invention. In this embodiment the input shaft is indicated at 60 and extends normal to the plane of the figure. The shaft carries a beveled gear, not shown, which meshes with a beveled gear 61 formed integrally at one end of a hollow shaft 62. The shaft 62 is mounted to rotate about a pivot pin 63 by bearings 64 and 65. The bearing 64 being carried in a cap assembly 66 at the outer end of the pin 63. The shaft 62 carries two bowl shaped members 67 and 68 respectively which are splined to one another and to the shaft so as to rotate therewith but to be able to slide axially thereon. These members 67 and 68 which correspond to the third members 38 of the drive of FIGS. 1 and 2 have external driving surfaces and internal driving surfaces. Thus the driving surfaces for the member 67 are indicated at 69 and 70 and the driving surfaces for the members 69 are indicated at 71 and 72.

The output shaft is indicated at 73 and carries three members 74, 75 and 76 all of bowl shape. The member 75 is secured to the shaft 73 but the members 74 and 76 respectively are mounted on sleeves 77 and 78 on which they may turn and relative to which they may slide. A ball cam arrangement indicated at 79 is provided between a flange 80 on the shaft 73 and the member 74 and a similar ball cam arrangement indicated at 81 is provided between the shaft 73 and the member 76. When the shaft 73 commences to transmit torque in either direction the ball cam arrangements 79 and 81 cause the members 74 and 76 to move towards the member 75.

The drive is transmitted in the manner described in relation to FIGS. 1 to 3 i.e. from the members 67 and 68 to the members 74, 75 and 76. The centres of the drive areas between the driving surfaces of the various members all lie on a line which passes through a point 82 which is the point of intersection of a first axis 83 about which the members 74, 75 and 76 rotate and a second axis 84 about which the members 67 and 68 rotate. It will be appreciated that, in order to avoid unwanted bending movements, there are preferably two sets of members such as 67 and 68 and each set of such members is pivotable about a third axis perpendicular to the plane of the Figure and passing through the point of intersection 82.

When drive is in one extreme position the drive areas between the members 67 and 74 will be at the positions indicated at $q_1$, $q_1$, in FIG. 4. When the drive is at the other extreme position the regions $q_2$, $q_2$ will be adjacent and the drive areas will be in these regions. It will be seen therefore that the drive areas will have moved through an angle about the third axis equivalent to the distance $q_1 q_2$ on member 67 while the pivot pins 63 have moved through a smaller angle equivalent to the distance $q_2 q_2$. This arrangement enables a comparatively large change of ratio to be obtained with a comparatively small change in angle of the pivot pins 63.

It will be seen that the invention provides a continuously variable friction drive in which the relative radii of the curvature between the engaging members can be large and in which comparatively large power may be transmitted by small size members.

Such a variable drive is suitable for a variety of applications. For example, by connecting the variable drive shown in FIG. 2 to a vehicle engine and the output to the ring gear of an epicyclic gear chain, and by taking a shaft driven at engine speed through the variable drive concentric with the input and output shafts and connecting the shaft to the sun gear of the epicyclic, the planet carrier of the epicyclic can be arranged to go from engine speed (or even overdrive) down to a geared neutral or even reverse.

Another arrangement of interest can be obtained by connecting the output shaft of a variable drive of the form shown in FIG. 2 with a gear ratio range of say 0.4 to 2.5 to the sun gear of an epicyclic gear chain. If the planet carrier is held fixed and the output is taken from the ring gear a step down ratio of say 2:1 can be obtained and the direction of the drive input to the variable drive, which is reversed in the variable drive, can be restored. The above arrangement would therefore give a gear ratio range of 0.2 to 1.25. The output from the above arrangement can be reversed by fixing the ring gear and taking the output from the planet carrier. The gear range in this reversed arrangement would be lower being of the order of 0.13 to 0.8. An automatic clutch arrangement could be incorporated in order to change from the forward to the reverse speed ranges and vice versa.

I claim:

1. A continuously variable friction drive comprising co-axial first and second members rotatable about a first axis and having convex and concave driving surfaces respectively, a third member rotatable about a second axis intersecting the first axis and having concave and convex driving surfaces arranged respectively to engage the convex and concave driving surfaces on the first and second members respectively, a pivotal mounting for the third member arranged so that the third member may pivot about a third axis, clamping means for causing relative movement between the first and second members thus to force parts of the driving surfaces on the first and second members into close proximity with adjacent parts of the driving surfaces on the third member, said parts providing drive areas through which drive takes place between the first and second members on the one hand and the third member on the other hand and actuating means for pivoting the third member about the third axis thus to vary the distances of said drive areas from at least one of the first and second axes thus to vary the ratio of the drive, the drive areas being substantially symmetrically disposed about a line passing through the intersection of said first and second axes.

2. A friction drive according to claim 1 in which two third members are provided, the third members each being pivotable in synchronism about a third axis and rotatable about a second axis, both said second axes and said first axis intersecting.

3. A friction drive according to claim 2 in which there are two sets of first and second members rotatable about a common first axis and the two third members are in engagement with the first and second members of each set.

4. A friction drive according to claim 1 in which the first, second and third members are generally bowl-shaped.

5. A friction drive according to claim 1 in which three of the four driving surfaces provided on the or each third member and the co-operating first and second members are toroidal and defined by circular arcs.

6. A friction drive according to claim 1 in which the driving surfaces are so shaped that, during the pivoting of the or each third member, as the distances of the contact areas from the first axis decrease the distances from the second axis or axes increase and vice versa.

7. A friction drive according to claim 1 in which the driving surfaces are so shaped that, during the pivoting of the or each third member, the distances of the contact areas from the second axis or axes remain the same and the distances from the first axis vary.

8. A friction drive according to claim 1 in which the driving surfaces are so shaped that, during the pivoting of the or each third member, the drive areas sweep through a larger angle about the third axis or axes than the third member or members.

9. A friction drive according to claim 1 in which the clamping means comprises an hydraulic piston and cylinder arrangement.

10. A friction drive according to claim 1 in which the clamping means comprises a ball or roller cam arrangement.

11. A friction drive according to claim 1 in which the clamping means comprises a spring.

* * * * *

UNITED STATES PATENT OFFICE
CERTIFICATE OF CORRECTION

Patent No. 3,837,233Dated September 24, 1974

Inventor(s) MICHAEL JOSEPH FRENCH

It is certified that error appears in the above-identified patent and that said Letters Patent are hereby corrected as shown below:

Front page of patent: The foreign application priority data should read --July 20, 1972 Great Britain........34004/72--.

Signed and sealed this 3rd day of December 1974.

(SEAL)
Attest:

McCOY M. GIBSON JR.
Attesting Officer

C. MARSHALL DANN
Commissioner of Patents